(12) United States Patent
Shiraishi et al.

(10) Patent No.: US 8,551,417 B2
(45) Date of Patent: Oct. 8, 2013

(54) REACTOR AND REACTION PLANT

(75) Inventors: Tomofumi Shiraishi, Hitachi (JP); Tsutomu Kawamura, Mito (JP); Takeyuki Kondo, Hitachi (JP)

(73) Assignee: Hitachi Plant Technologies, Ltd., Tokyo (JP)

(*) Notice: Subject to any disclaimer, the term of this patent is extended or adjusted under 35 U.S.C. 154(b) by 37 days.

(21) Appl. No.: 13/060,655

(22) PCT Filed: Aug. 12, 2009

(86) PCT No.: PCT/JP2009/064248
§ 371 (c)(1),
(2), (4) Date: Feb. 24, 2011

(87) PCT Pub. No.: WO2010/024123
PCT Pub. Date: Mar. 4, 2010

(65) Prior Publication Data
US 2011/0171082 A1 Jul. 14, 2011

(30) Foreign Application Priority Data

Aug. 25, 2008 (JP) ................................ 2008-214792

(51) Int. Cl.
*B01J 19/00* (2006.01)
*B01F 13/00* (2006.01)

(52) U.S. Cl.
USPC ........... 422/224; 422/603; 422/135; 422/138; 422/109; 422/110; 422/198; 366/341; 366/336; 366/181.5; 366/181.6; 366/182.2; 366/177.1; 366/176.1

(58) Field of Classification Search
USPC ......... 422/224, 603, 135, 138, 109, 110, 111, 422/198; 366/341, 336, 181.5, 181.6, 366/182.1, 182.2, 177.1, 176.1
See application file for complete search history.

(56) References Cited

U.S. PATENT DOCUMENTS 5,811,062 A * 9/1998 Wegeng et al. ................ 422/129
7,579,191 B2 * 8/2009 Nagasawa et al. ............... 436/52
(Continued)

FOREIGN PATENT DOCUMENTS

| CN | 1151126 A | 6/1997 |
| CN | 1572363 A | 2/2005 |

(Continued)

OTHER PUBLICATIONS

JP office action of Appln. No. 2008-214792 dated Dec. 25, 2012.
(Continued)

*Primary Examiner* — Walter D Griffin
*Assistant Examiner* — Lessanework Seifu
(74) *Attorney, Agent, or Firm* — Antonelli, Terry, Stout & Kraus, LLP.

(57) ABSTRACT

In order to provide, when a plurality of fluids each containing a different kind of substance are mixed and reacted, a reactor having a mixing channel capable of forming a multi-layered flow in a radial direction in the cylindrically-shaped mixing channel; improving mixing performance by synergizing swirling effects of mixture of turbulent flows and a swirling flow; and producing a reaction product with a high yield as well as high efficiency, a mixing channel 1 which mixes fluids 4 and 5 each containing the different kind of substance is cylindrically shaped, and inlet passages 2 and 3 which introduce the fluids 4 and 5, respectively, are plurally arranged in a manner offset from a central axis of the mixing channel 1.

16 Claims, 21 Drawing Sheets

(56) References Cited

U.S. PATENT DOCUMENTS

| | | |
|---|---|---|
| 2004/0027915 A1 | 2/2004 | Lowe et al. |
| 2005/0043546 A1 | 2/2005 | Brechtelsbauer et al. |
| 2008/0165616 A1 * | 7/2008 | Schubert et al. .............. 366/145 |

FOREIGN PATENT DOCUMENTS

| | | |
|---|---|---|
| JP | 53-88878 | 7/1978 |
| JP | 57-117328 A | 7/1982 |
| JP | 04-016222 | 1/1992 |
| JP | 2003-508691 A | 3/2003 |
| JP | 2005-500350 | 1/2005 |
| JP | 2005-224175 | 8/2005 |
| JP | 2006-167600 | 6/2006 |
| JP | 2006-247533 | 9/2006 |
| JP | 2006-346653 | 12/2006 |
| JP | 2008-012453 | 1/2008 |
| JP | 2008-168168 A | 7/2008 |
| JP | 2008-207087 | 9/2008 |
| WO | WO 96/00126 A1 | 1/1996 |
| WO | WO 01/18451 A1 | 3/2001 |
| WO | WO02/16017 | 2/2002 |

OTHER PUBLICATIONS

Chinese office action of Appln. No. 200980133129.7 dated Dec. 27, 2012 with partial English translation.
CN Office Action of Appln. No. 200980133129.7 dated Aug. 8, 2013.

* cited by examiner

A-A CROSS SECTION

REACTOR AND REACTION PLANT

TECHNICAL FIELD

The present invention relates to a reactor and a reacting plant each of which mixes liquids or gases in a channel and reacts the liquids and the gases, in a field such as chemical synthesis or chemical analysis.

BACKGROUND ART

In recent years, in a field of chemical synthesis or chemical analysis, a reactor, which has been manufactured by a microfabrication technique called MEMS (Micro Electro Mechanical System) and configured of a channel having a cross-sectional dimension of dozens to hundreds μm, is beginning to be used. Such reactor is called a micromixer or a microreactor.

The microreactor merge fluids of two or more types of substances, the substances mutually reacting, and brings the fluids into contact with each other in a fine channel to generate a chemical reaction. In the microreactor, a width or a height of the channel is small; a surface area per cubic volume of a reacting part is large; and inner volume of the channel is small. Thus, the microreactor has a short mixing time of the substances and fast heat exchange, and as a result, has effects that by-products due to the reaction decrease and a reaction yield becomes high.

Patent Document 1 describes that a high-temperature and high-pressure micromixer configured such that central axes of a first reaction-solution introducing tube, an effluent tube, and a mixing part are made coincident, and provided are two second reaction-solution introducing tubes arranged rotationally as well as symmetrically with respect to the central axis and having an offset without intersecting at one point on the central axis.

Additionally, a conventional technology described in Patent Document 2 includes to, for lessening an interval of two types of fluids flowing in a mixing channel, divide the respective fluids into multiple ones at an upstream of the mixing channel; alternately flow the two types of fluids; and contract flows thereof in a flow-contract part.

Patent Document 1: JP Application Publication No. 2008-12453 A

Patent Document 2: PCT International Publication Number No. WO02/16017 A

DISCLOSURE OF THE INVENTION

Problems to be Solved by the Invention

The high-temperature and high-pressure micromixer described in Patent Document 1 is configured to introduce a first reaction-solution into a central axis and provide two second reaction-solution introducing tubes having an offset without intersecting at one point on the central axis. Thus, the aforementioned micromixer has problems that multi-layered flows are hard to be formed, and a distance for mixing the flows becomes long.

In the micromixer described in Patent Document 2, an interval between two types of fluids in a mixing channel at a downstream can be lessened by increasing the number of divisions of the fluids and making the fluids multi-layered. However, a width of an inlet port of the respective fluids at an upstream of a flow-contract part generally falls in the range of 500 μm to several mm in consideration of fabrication preciseness and blockage of the channel. Therefore, in order to increase the number of layers, the width of an inlet of the flow-contract part becomes large, and the distance to the inlet of the mixing channel becomes long. Accordingly, it is likely that mixture and a reaction would be started between different kinds of the fluids adjacent to each other in the flow-contract part before the flow reaches the mixing channel. There is a problem that if the reaction occurs in the flow-contract part having a large diffusion length W, a proportion of a by-product increases, and a yield decreases. Here, the diffusion length W is the width per layer or the distance between centers of the adjacent layers.

An object of the present invention is to provide a reactor and a reaction plant capable of eliminating the channel as the flow-contract part having the large diffusion length W; starting the mixture and the reaction in the mixing channel having the small diffusion length W to improve the yield; and performing mass-volume processing.

Means for Solving the Problems

In order to achieve the above-mentioned object, for improving mixing performance by synergizing an effect of decreasing a diffusion length by means of a multi-layered flow and an effect of increasing substance diffusion by means of a turbulent flow as well as that of stirring by means of a swirling flow, with respect to a cylindrically-shaped mixing channel which mixes a plurality of fluids each containing a different kind of substance, a reactor according to the present invention is configured to connect inlet passages to the mixing channel, the inlet passages introducing the plurality of fluids into the mixing channel, such that a central axis of the inlet passage does not intersect with that of the mixing channel. In addition, the mixing channel is configured to be under turbulent flow conditions.

Effects of the Invention

According to the present invention, it is possible to decrease a diffusion length by flowing a plurality of fluids alternately layered in a radial direction in a mixing channel and facilitating miscibility of the plurality of fluids by synergizing effects of a turbulence flow and a swirling flow, thereby suppressing a side reaction and actualizing mass-volume processing with a high reaction yield.

DESCRIPTION OF SYMBOLS

| | |
|---|---|
| 1: | Mixing channel |
| 2, 3: | Inlet passage |
| 4, 5: | Fluid |
| 6: | Swirling flow |
| 8: | Mixing channel outlet |
| 9: | Reactor |
| 10: | Sealing board |
| 11, 31: | Buffer |
| 12, 32: | Buffer inlet passage |
| 13: | Structure |
| 14: | Pedestal |
| 15: | Flow path for heat medium |
| 16: | Heat medium |
| 18: | Raw-material storage tank |
| 19: | Pump |
| 20: | Pressure gauge |
| 21: | On-off valve |
| 22: | Flow-rate regulating valve |
| 23: | Flow meter |
| 24: | Constant-temperature bath |
| 25: | Reaction flow path |
| 26: | Product storage tank |
| 41: | Outlet component |
| 42: | Passage component |
| 43: | Buffer component |
| 45, 46: | Introducing passage |

BEST MODE FOR CARRYING OUT THE INVENTION

Each of embodiments according to the present invention will be described by use of the drawings.

Embodiment 1

Figure 1:
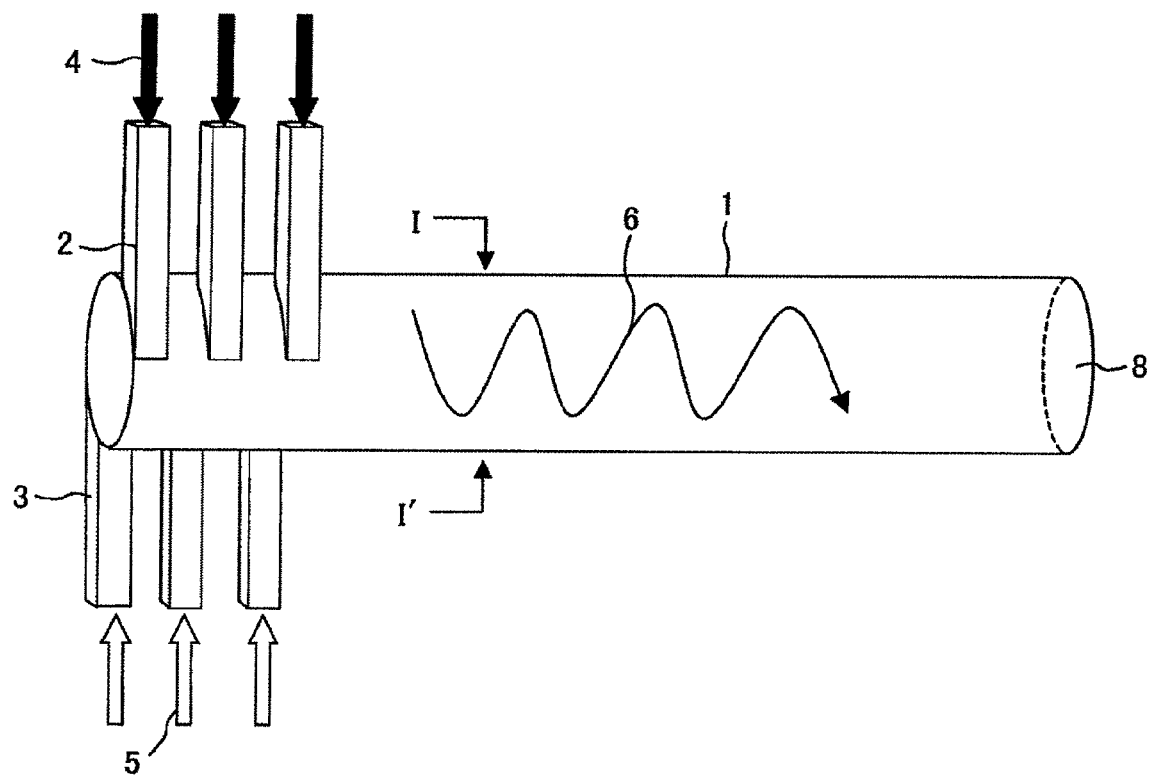
FIG. 1 is a perspective view illustrating a configuration of a reactor which is Embodiment 1 of the present invention.

Embodiment 1 according to the present invention will be described with reference to FIGS. 1 to 9. FIG. 1 is a configuration view of a reactor according to the present embodiment.

Figure 2:
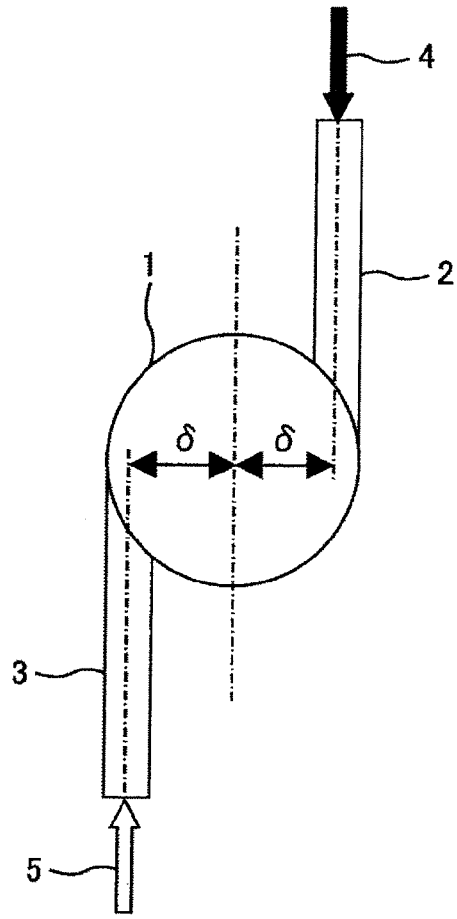
FIG. 2 is a side view in which the reactor illustrated in FIG. 1 is viewed from an upstream side.

As shown in FIG. 1, an end of a cylindrically-shaped mixing channel 1 is sealingly closed, and on a side of the sealingly-closed end, there are provided an inlet passage 2 for introducing a fluid 4 containing a substance A into the mixing channel 1 and an inlet passage 3 for introducing a fluid 5 containing a substance B into the mixing channel 1. The inlet passages 2 and 3 are plurally provided in a spaced-apart manner in a flow direction of the mixing channel 1. As shown in FIG. 2, each of the inlet passages 2 and 3 is arranged at a position offset by a distance of 6 with respect to a central axis of the mixing channel 1. The inlet passages 2 and 3 are placed on an identical plane orthogonal to the central axis of the mixing channel 1, and are positioned in a direction opposite to each other. In an example illustrated in FIG. 1, the respective passages are formed in a rectangular shape. Here, the cylindrical shape may be a polygon shape which approximates a circle, and including these, is referred to as the "cylindrical shape" for convenience sake. The description "the inlet passages 2 and 3 are placed on an identical plane orthogonal to the central axis of the mixing channel 1" is defined including one where the inlet passages 2 and 3 are partly placed on a plane.

In the example illustrated in FIG. 1, the fluid 4 containing the substance A flows from the three inlet passages 2, whereas the fluid 5 containing the substance B flows from the three inlet passages 3, respectively, into the mixing channel 1. The fluid 4 flown from the inlet passage 2 flows so as to follow the cylindrical shape. The fluid 5 flown from the inlet passage 3 flows in so as to follow a flow of the fluid 4.

As described above, the inlet passages 2 and 3 are placed on the identical plane orthogonal to the central axis of the mixing channel 1, and the central axis of the respective inlet passages 2 and 3 is offset merely by the distance of 6 with respect to a central line of the mixing channel 1. Thus, the fluid 4 flown from the inlet passage 2 and the fluid 5 flown from the inlet passage 3 become a swirling flow 6 in the mixing channel 1.

Figure 3:
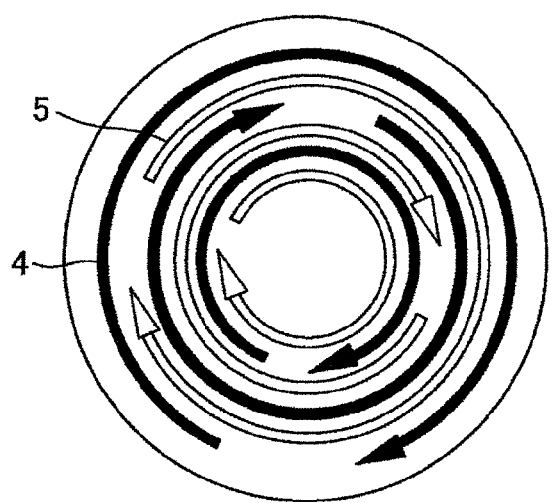
FIG. 3 is a cross-sectional view as viewed from a direction of an arrow I-I' in FIG. 1.

The inlet passages 2 and 3 are arranged in the spaced-apart manner in the flow direction of the mixing channel 1. Thus, a flow shown in a cross section as viewed from a direction of an arrow I-I' of the mixing channel 1 in FIG. 1 forms the swirling flow in which the fluids 4 and 5 are alternately layered in a radial direction as shown in FIG. 3. When such flow occurs, a diffusion length of two types of the fluids decreases, and accordingly, an effect of the swirling flow improves miscibility. The flow in the mixing channel is flown under turbulent flow conditions, thereby further improving the mixing performance due to mixture of turbulent flows.

Here, when the fluid 4 containing the substance A reacts with the fluid 5 containing the substance B, a main product R is generated as indicated in Formula 1. As indicated in Formula 2, the main product R reacts with the substance B to generate a by-product S.

(Formula 1)

$$A + B \rightarrow R \qquad (1)$$

(Formula 2)

$$R + B \rightarrow S \qquad (2)$$

A microreactor has a small hydraulic equivalent diameter of the channel, so that the Reynolds number, which is a dimensionless number indicative of a ratio of inertial force and viscous force of a fluid, is small. The flow, thus, becomes a laminar flow. Accordingly, when the plural substances contained in the fluid are mixed, molecular diffusion of the substance facilitates the mixture. Formula 3 expresses a mixing time $t_m$ [s] of the respective substances in the case of flowing the fluid 4 containing the substance A and the fluid 5 containing the substance B.

(Formula 3)

$$t_m = W^2/D \qquad (3)$$

Here, D [m²/s] is a diffusion coefficient, and expresses a molecular diffusion coefficient of the substance in the fluid under laminar flow conditions, whereas W [m] is the diffusion length (a width per layer of a multi-layered flow or a distance between the centers of neighboring layers).

As will be appreciated from Formula 3, the mixing time is proportional to the square of the diffusion length W, so that the smaller the width of the channel is, the shorter the mixing time is. Additionally, when the flow transits from the laminar flow to the turbulent one, the diffusion coefficient D in Formula 3 becomes a turbulent diffusion coefficient. The turbulent diffusion coefficient has a value thousands of times larger than that of the molecular diffusion coefficient, so that the mixing time becomes shorter under the turbulent flow conditions, rather than under the laminar flow conditions.

Meanwhile, provided that a reaction rate constant of a main reaction in Formula 1 and that of a secondary reaction in Formula 2 are $k_1$ [m³/(kmol·s)] and $k_2$ [m³/(kmol·s)], respectively, and initial concentration in the case where concentration of the substances A and B are reacted as isoconcentration is $C_0$ [kmol/m³], a reaction time $t_r$ [s] of the main product R is given by Formula 4.

(Formula 4)

$$t_r = 1/(k_1 C_0) \qquad (4)$$

In competitive-consecutive reactions, indicated in Formulas 1 and 2, in a microchannel, as indicated in Formula 5, the more the mixing-reaction number Ø decreases, the mixing-reaction number Ø being a ratio of the mixing time in Formula 3 to the reaction time in Formula 4, the closer it comes to a reaction-controlled condition, and accordingly, the more a reaction yield increases, the reaction yield being a production amount of the main product R which is an objective substance with respect to the substance A.

(Formula 5)

$$\emptyset = t_m/t_r = k_1 C_0 W^2/D \qquad (5)$$

Therefore, it turns out that in order to improve the reaction yield of the main product R, by thinning the width per layer of the multi-layered flow, the diffusion length W is shortened, and accordingly, the mixing-reaction number Ø is lessened. According to this, in the present embodiment, the inlet passages 2 and 3 are arranged in the spaced-apart manner in the flow direction of the mixing channel 1, thereby allowing the mixing-reaction number Ø to be lessened and the reaction yield to be improved.

An inner diameter of the mixing channel 1 is not limited. However, it is preferable to configure the inner diameter to be less than 10 mm. In addition, it is indifferent whether the flow is the laminar flow or the turbulent one. However, as mentioned above, the turbulent flow has the mixing performance better than the mixing performance of the laminar flow. FIG. 1 illustrates the case where each of the inlet passages 2 and 3 has the rectangular shape. However, an arbitrary shape such as a round one is applicable to the shape of the inlet passages.

Figure 4:
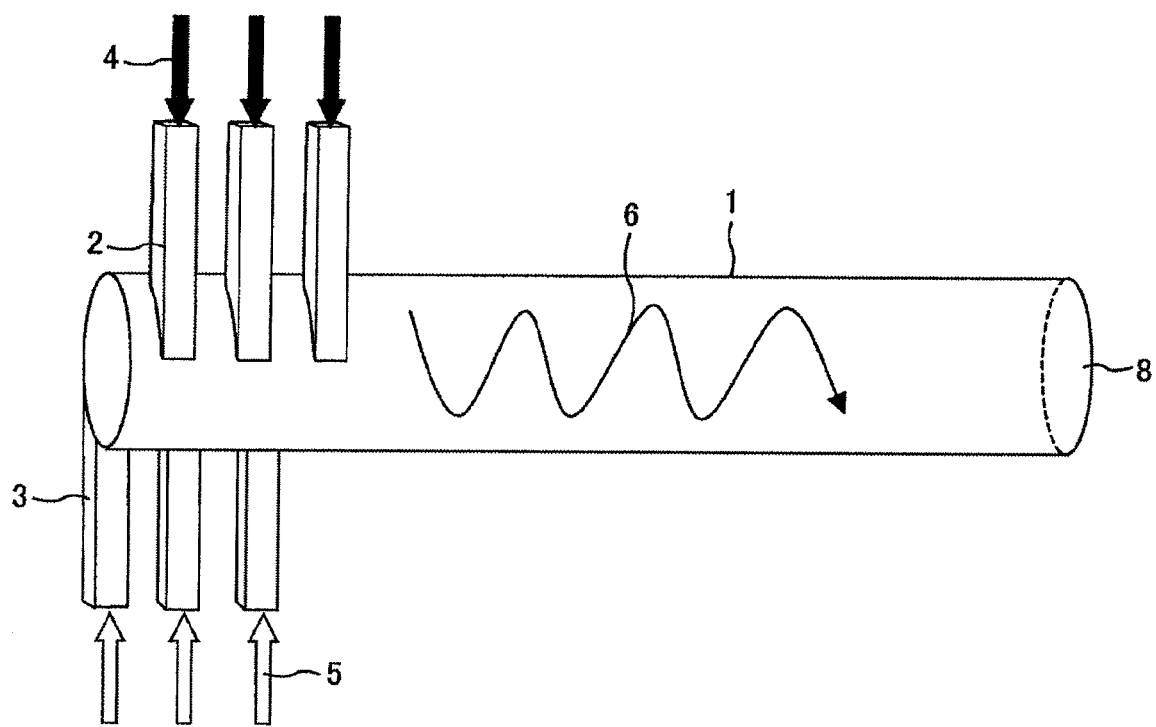
FIG. 4 is a perspective view illustrating a modified example of the reactor according to Embodiment 1 of the present invention.
Figure 5:
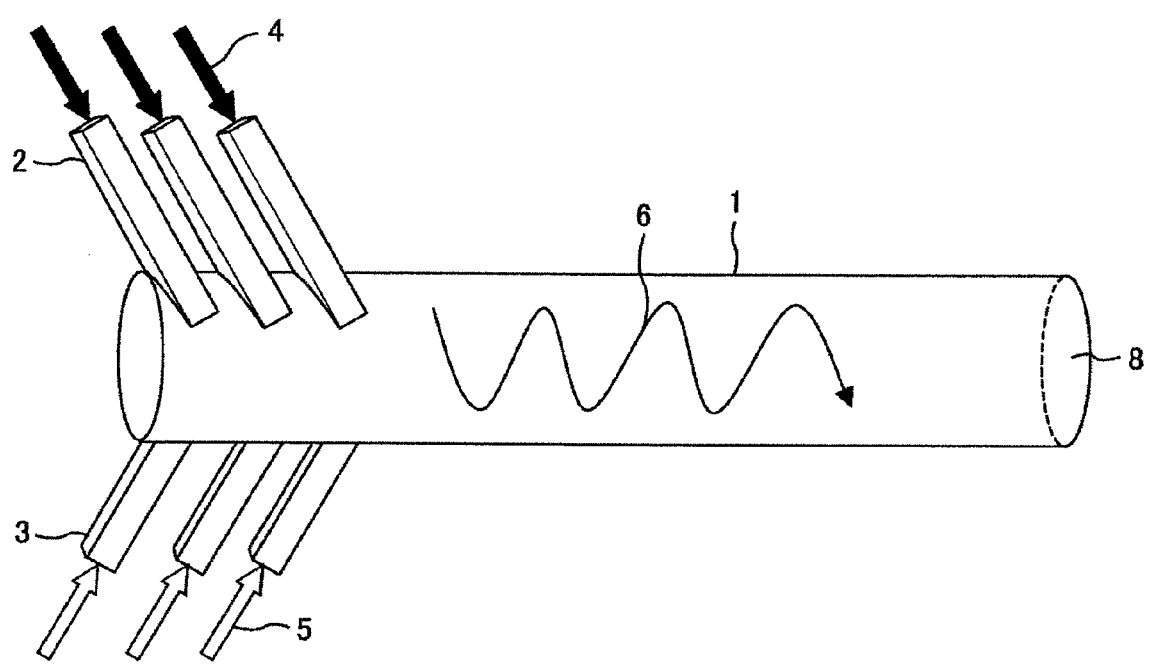
FIG. 5 is a perspective view illustrating a modified example of the reactor according to Embodiment 1 of the present invention.

FIG. 1 illustrates the example in which the inlet passages are provided on the identical plane perpendicular to the central axis of the mixing channel 1. However, the inlet passages 2 and 3 may be provided in such a manner as to be displaced from the identical plane perpendicular to the central axis of the mixing channel 1 as illustrated in FIG. 4.

In order to improve productivity of the reactor, it is required to increase throughput as well as the reaction yield. In an example illustrated in FIG. 5, by placing each of the inlet passages 2 and 3 at an angle less than 90 degrees with respect to the central axis of the mixing channel 1, a pressure loss when the fluids 4 and 5 flow into the mixing channel 1 decreases, and thus, a processing flow rate increases.

Figure 6:
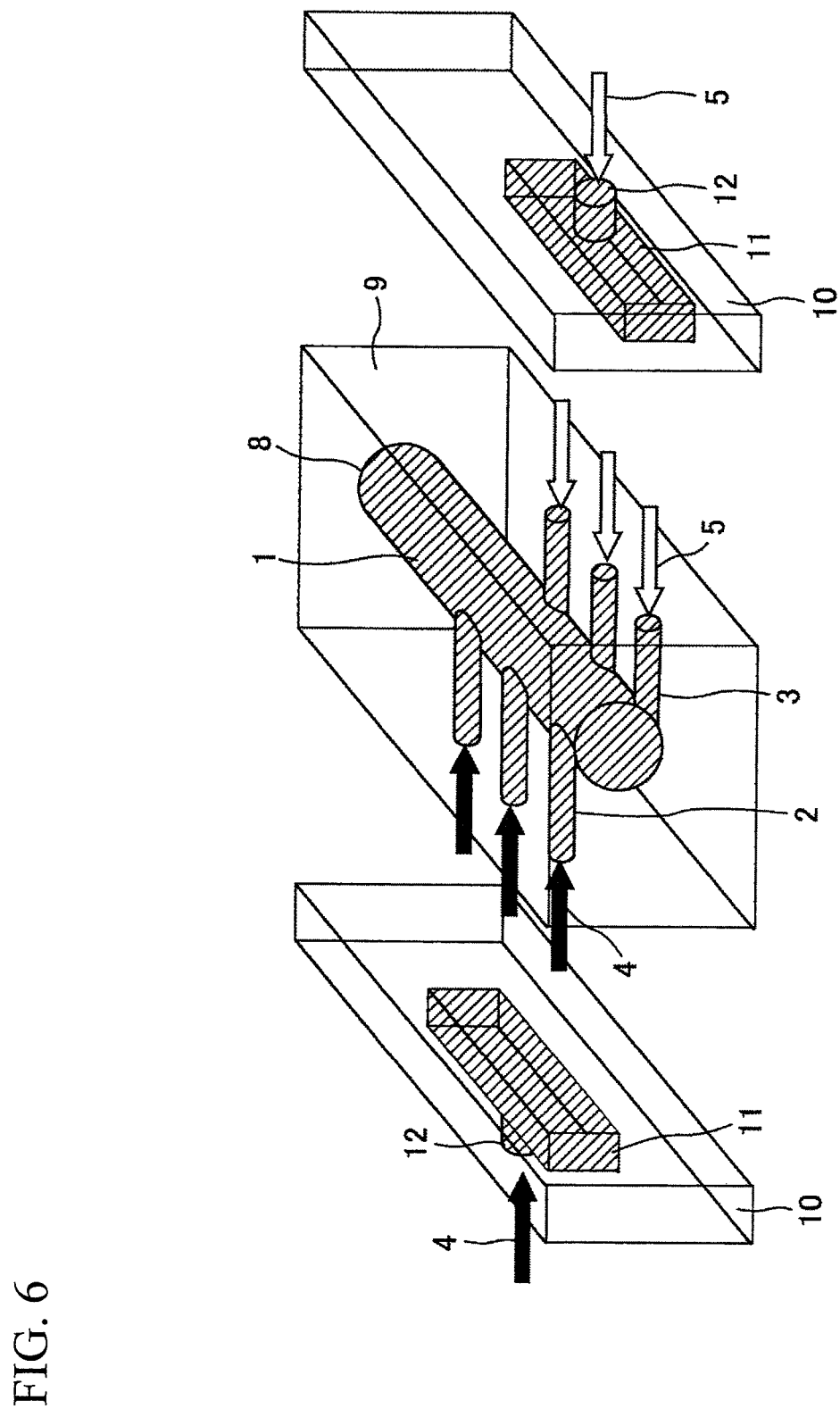
FIG. 6 is a perspective view illustrating a method for manufacturing the reactor according to Embodiment 1 of the present invention.

FIG. 6 illustrates one example of a specific method for manufacturing the channel of the reactor according to the present embodiment. The reactor 9 includes a rectangular-shaped structure. The mixing channel 1 is formed by fabricating a cylindrical hole from the side of a mixing channel outlet 8. The inlet passages 2 and 3 are formed by fabricating a plurality of holes perpendicularly to the mixing channel 1 from side faces of the both sides of the reactor 9. At this time, each of the inlet passages 2 and 3 is formed at the position offset from the central axis of the mixing channel 1. In order to flow the fluid into the respective inlet passages 2 and 3 at a uniform flow rate, a buffer 11, which will be a space for temporarily storing therein the fluid, and a sealing board 10, in which a buffer inlet passage 12 is fabricated, are placed on the side face of the both sides of the reactor 9.

Materials of the reactor can include metal, glass, plastic, or the like, and are not limited. Additionally, for connection of the reactor 9 to the sealing board 10, bolt bonding via a sealant material such as an O-ring is used. Alternatively, in the case of metal, welding or diffusion bonding is used for the aforementioned connection.

As described above, according to the present embodiment, it is possible to improve the miscibility of the plural fluids, and thus possible to provide the mixing channel which suppresses a side reaction and has a high yield as well as high productivity.

Figure 7:
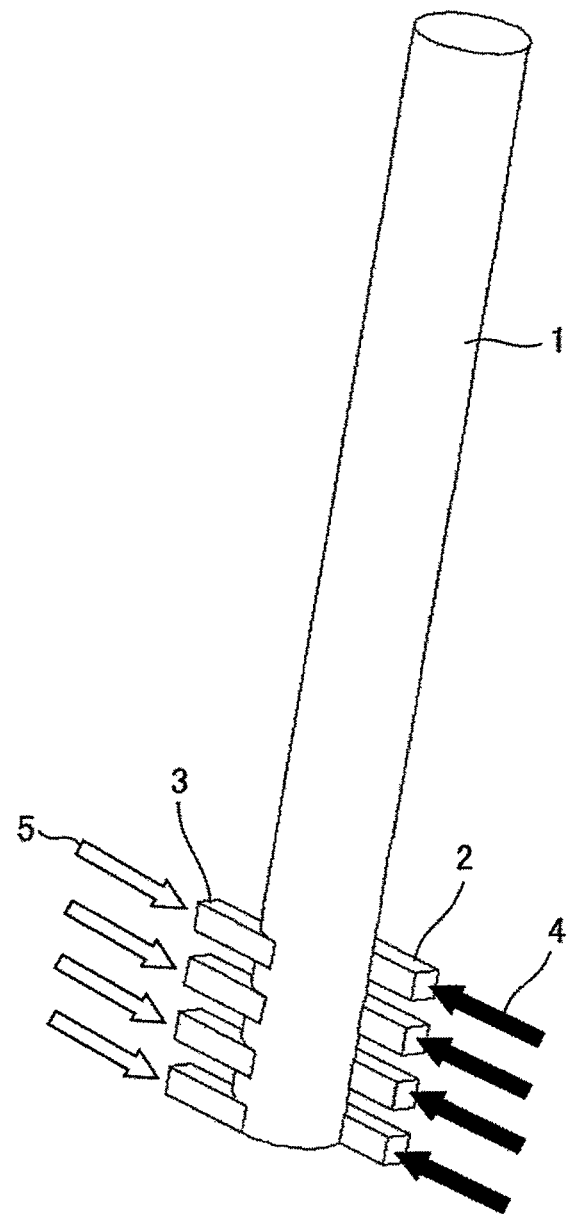
FIG. 7 is a perspective view illustrating an analytical model of the reactor corresponding to Embodiment 1 of the present invention.

FIG. 7 illustrates a modified example of the example in FIG. 1. FIG. 7 is a perspective view of the reactor according to the present embodiment. In the example illustrated in FIG. 7, the inlet passages 2 and 3 are provided four by four.

According to a result of numerical analysis of the example illustrated in FIG. 7, an effect of the present embodiment mentioned above will be described.

In this numerical analysis, each of the inlet passages 2 and 3, being provided four by four, had a passage cross-section of 250 μm in height and width, and a passage length of 10 mm. The mixing channel 1 had the round-shaped passage cross-section of 1 mm in diameter, and the passage length of 80 mm. When inlet flow velocity in each of the inlet passages 2 and 3 was set to 3.333 m/s, the Reynolds number in the respective inlet passages 2 and 3 was 830, and accordingly, the flow was under the laminar flow conditions, whereas the Reynolds number in the mixing channel 1 was 2,120, and accordingly, the flow was under the turbulent flow conditions. At this time, the flow rate at the mixing channel outlet was 100 mL/min.

Figure 8:
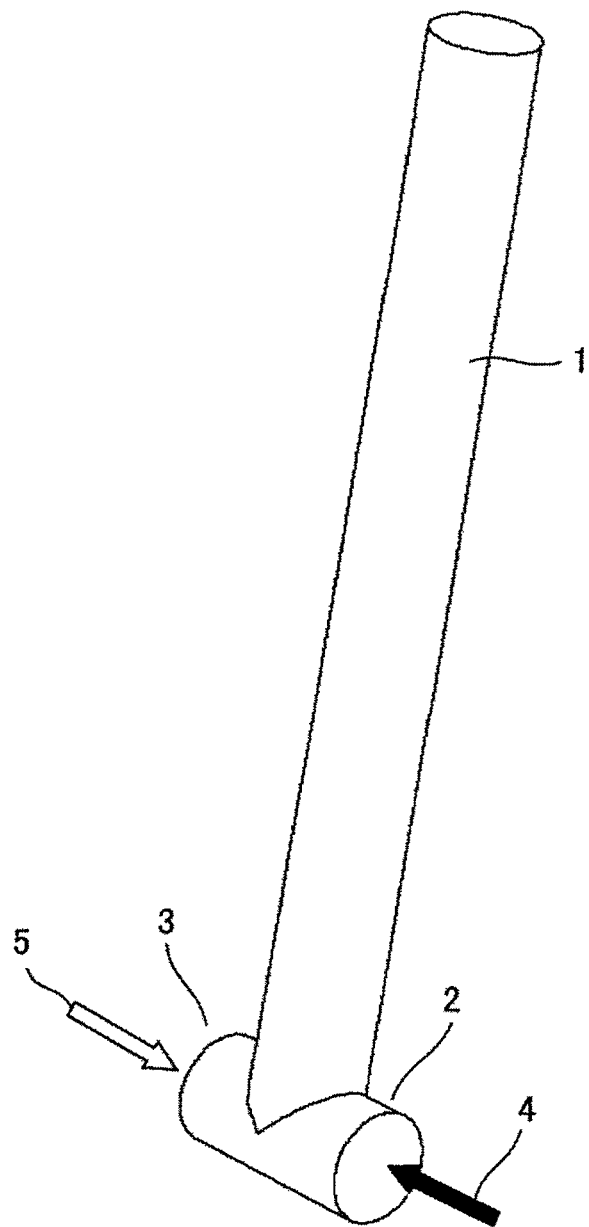
FIG. 8 is a perspective view illustrating an analytical model of a T-shaped reactor which is a comparative example.

As a comparative example, a T-shaped reactor was analyzed. FIG. 8 is a perspective view illustrating a configuration of the T-shaped reactor serving as the comparative example. The inlet passages 2 and 3, each being formed as a T-shape, have a hollow round shape, and are provided one by one in opposition to the end of the mixing channel 1.

In this numerical analysis, each of the inlet passages 2 and 3 had the passage cross-section of 1 mm in diameter and the passage length of 10 mm. The mixing channel 1 had the round-shaped passage cross-section of 1 mm in diameter and the passage length of 80 mm. When the inlet flow velocity in each of the inlet passages 2 and 3 was set to 1.061 m/s, the Reynolds number in the respective inlet passages 2 and 3 was 1,060, and accordingly, the flow was under the laminar flow conditions, whereas the Reynolds number in the mixing channel 1 was 2,120, and accordingly, the flow was under the turbulent flow conditions. At this time, an average flow rate in the mixing channel was 100 mL/min.

Note that the respective fluids 4 and 5 had identical physical properties, and the degree of density of $10^3$ kg/m$^3$, and the degree of viscosity of $10^{-3}$ Pa·s. The substance A, which would be a tracer, was mixed in the fluid 4 with concentration of 1 kmol/m$^3$. The molecular diffusion coefficient of the substance A was $10^{-9}$ m$^2$/s.

Figure 9:
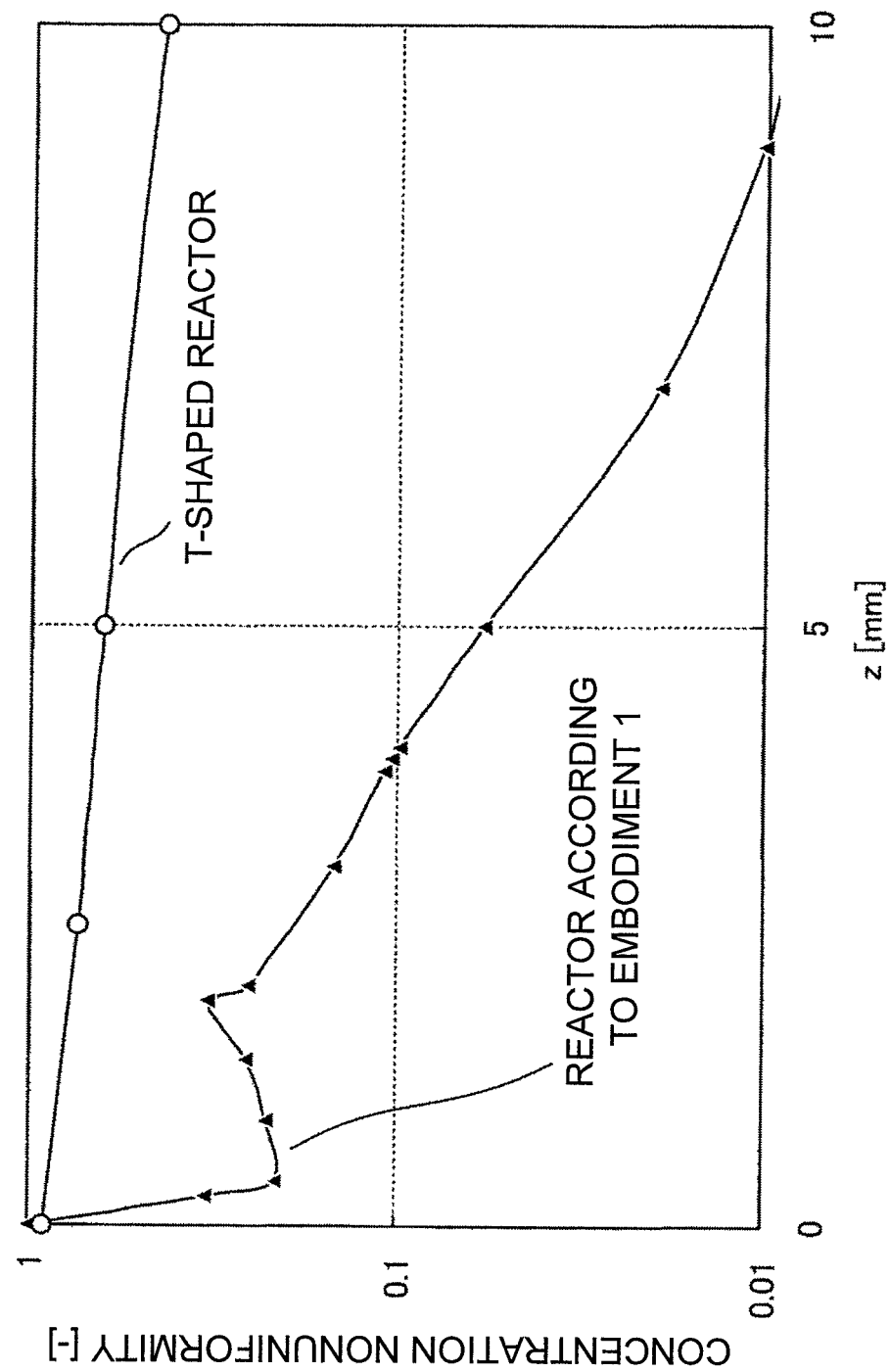
FIG. 9 is a graph showing an analytical result of mixing performance of the reactor.

As described above, after the numerical analysis with respect to the reactor according to the present embodiment and the T-shaped reactor, the analytical result as shown in FIG. 9 was obtained. FIG. 9 shows a state in which concentration nonuniformity of the fluid decreases along the flow direction of the mixing channel 1. It is to be noted that the concentration nonuniformity is given by Formula 6. In Formula 6, $C_{av}$ expresses average concentration of the substance A [kmol/m$^3$] at the passage cross-section; C expresses local concentration of the substance A [kmol/m$^3$] at the passage cross-section; and u expresses local flow velocity [m/s] at the passage cross-section of the substance A. Integral signs in Formula 6 mean to perform integration with respect to the passage cross-section.

[Formula 6]

$$\frac{\sqrt{\frac{\int_A (C - C_{av})^2 u \, dA}{\int_A u \, dA}}}{C_{av}} \qquad (6)$$

In FIG. 9, immediately after merging of the fluids 4 and 5, a residence time is 0 and the concentration nonuniformity is 1. Then, when the fluids 4 and 5 proceed along the flow direction (in other words, the residence time elapses) and mixes completely, the concentration becomes uniform, and accordingly, the concentration nonuniformity is 0. As shown in FIG. 9, it turns out that compared with the T-shaped reactor, the reactor according to the present embodiment has a larger change ratio (slope of a curved line) of the concentration nonuniformity and can shorten a mixing time.

Embodiment 2

Figure 10:
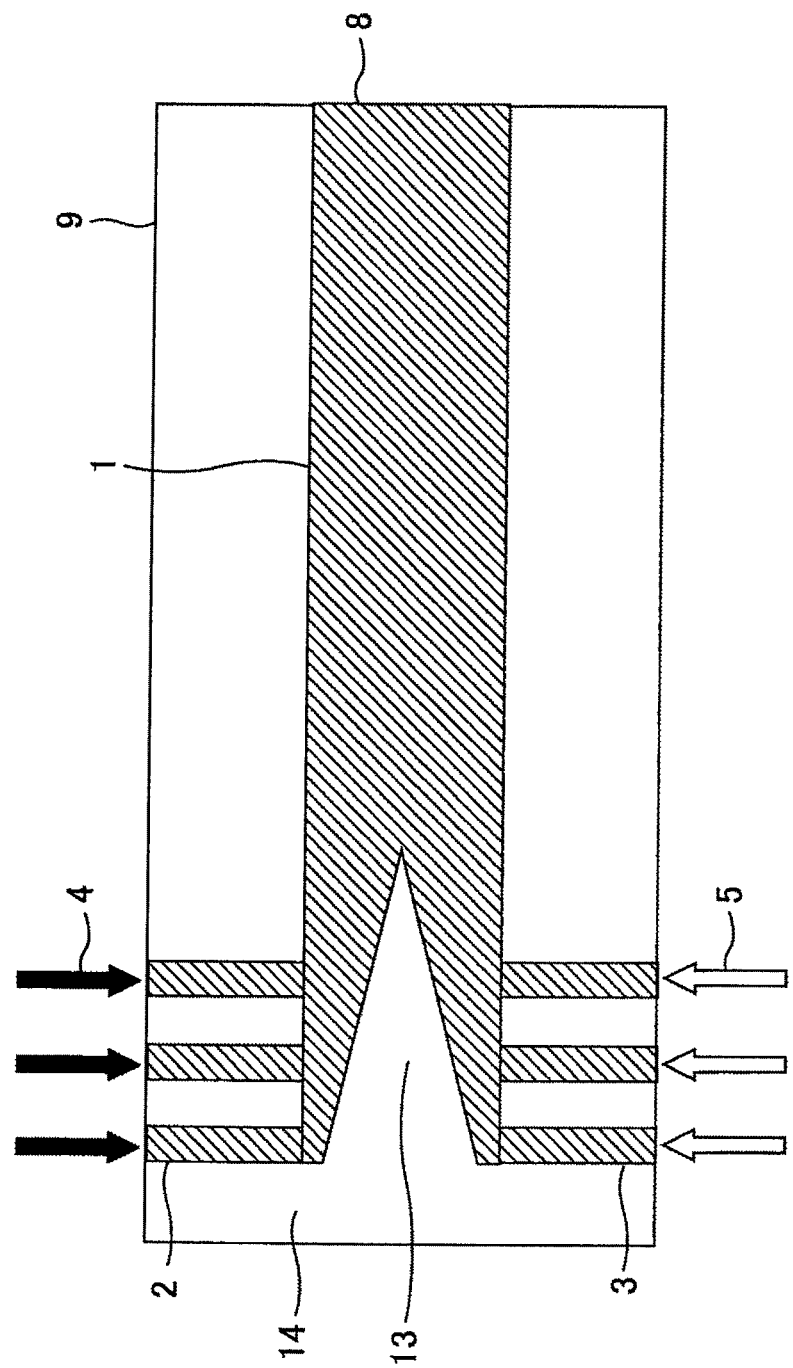
FIG. 10 is a longitudinal sectional view illustrating a configuration of the reactor which is Embodiment 2 of the present invention.
Figure 11:
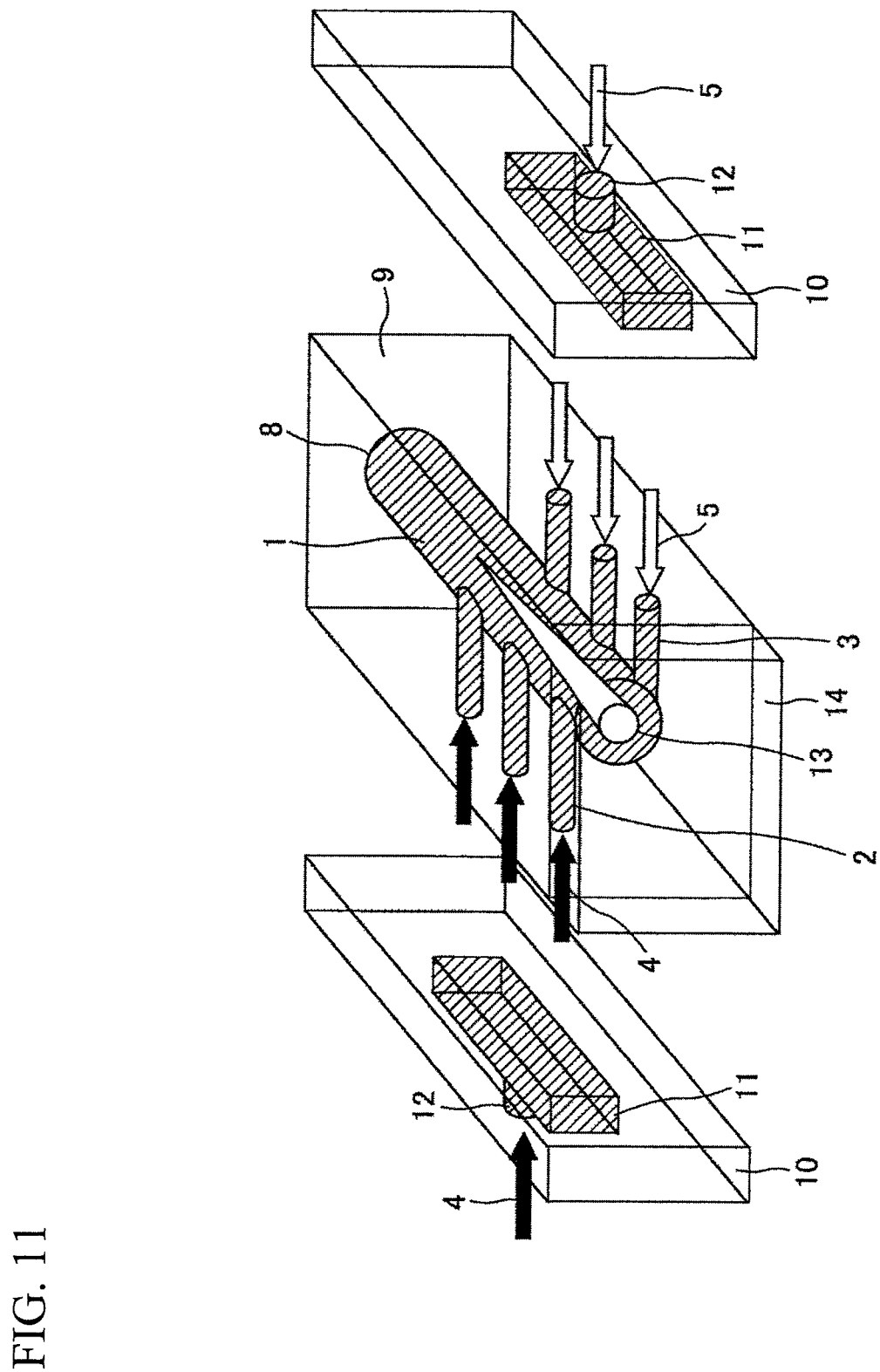
FIG. 11 is a perspective view illustrating a method for manufacturing the reactor according to Embodiment 2 of the present invention.

Embodiment 2 according to the present invention will be described with reference to FIGS. 10 and 11. FIG. 10 is a longitudinal sectional view illustrating the mixing channel according to the present embodiment. FIG. 11 is a perspective view illustrating a method for manufacturing the present embodiment.

The present embodiment is configured similarly to Embodiment 1. However, in the present embodiment, a structure 13 is mounted at the center of the channel of a part where the inlet passages 2 and 3 are placed, of the mixing channel 1. A cross-sectional area, of the structure 13, in a direction perpendicular to the central axis of the mixing channel 1 is shaped so as to decrease in the flow direction.

Such structure leads to a decrease in the cross-sectional area of the channel at an inlet passage part of the mixing channel 1, so that the width of the layer of the respective fluids 4 and 5 is lessened, and the diffusion length decreases, thereby improving the mixing performance.

The method for manufacturing the present embodiment is similar to the method for manufacturing Embodiment 1. However, in the present embodiment, the structure is mounted at an inlet part of the mixing channel 1, so that a pedestal 14 in which the structure 13 is mounted at the center of the channel is placed from an upstream direction.

According to the present embodiment, it is possible to improve the miscibility of the plural fluids, and thus possible to provide the mixing channel which suppresses a side reaction and has a high yield as well as high productivity.

Embodiment 3

Figure 12:
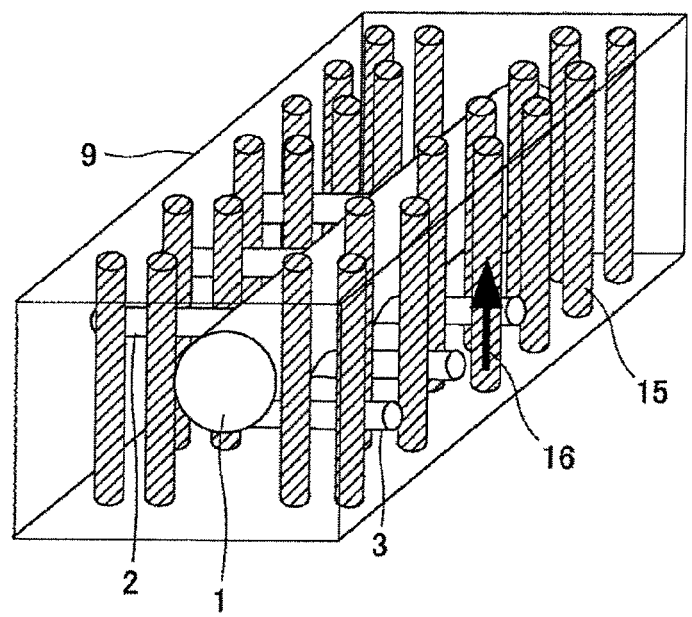
FIG. 12 is a perspective view illustrating a configuration of the reactor which is Embodiment 3 of the present invention.

Embodiment 3 according to the present invention will be described with reference to FIG. 12. FIG. 12 is a perspective view illustrating a structure for controlling temperature in the mixing channel. The reactor 9 has a block structure, so that its heat transfer performance is likely to be lowered. An improvement in the reaction yield requires precise temperature control. Accordingly, in order to improve the heat transfer performance of the reactor having the block structure, a plurality of flow paths 15 for distributing a heat medium 16 are provided as illustrated in FIG. 12. The flow path 15 may be plurally provided along the mixing channel 1, or may be provided along the inlet passages 2 and 3.

In addition, although not illustrated in the figure, a plurality of fins may be provided in the reactor 9 in place of the flow paths 15.

As described above, according to the present embodiment, it is possible to perform the temperature control along the mixing channel 1, so that the reaction yield can be improved.

Embodiment 4

Figure 13:
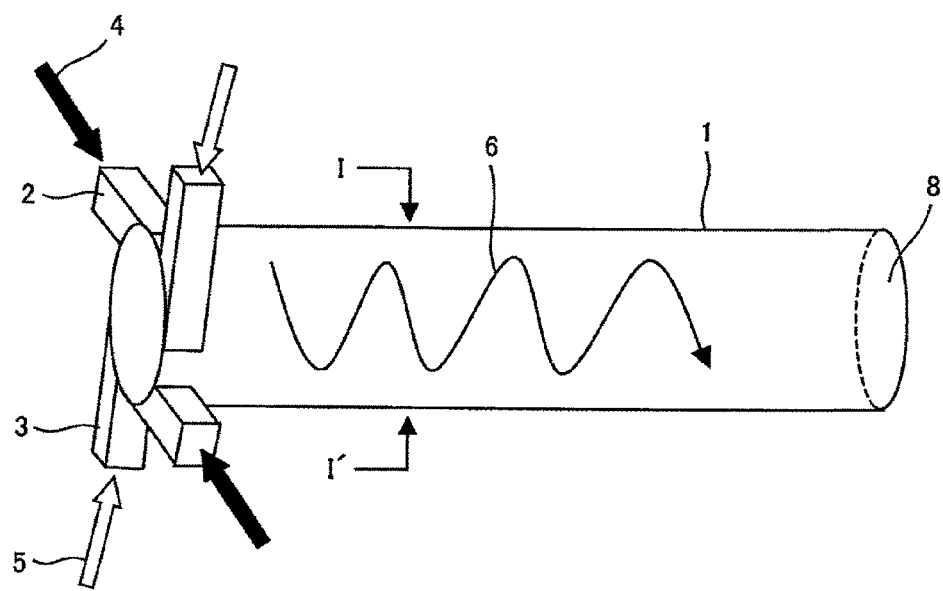
FIG. 13 is a perspective view illustrating a configuration of the reactor which is Embodiment 4 of the present invention.

Embodiment 4 according to the present invention will be described with reference to FIGS. 13 to 23. FIG. 13 is a configuration view of the reactor according to the present embodiment.

Figure 14:
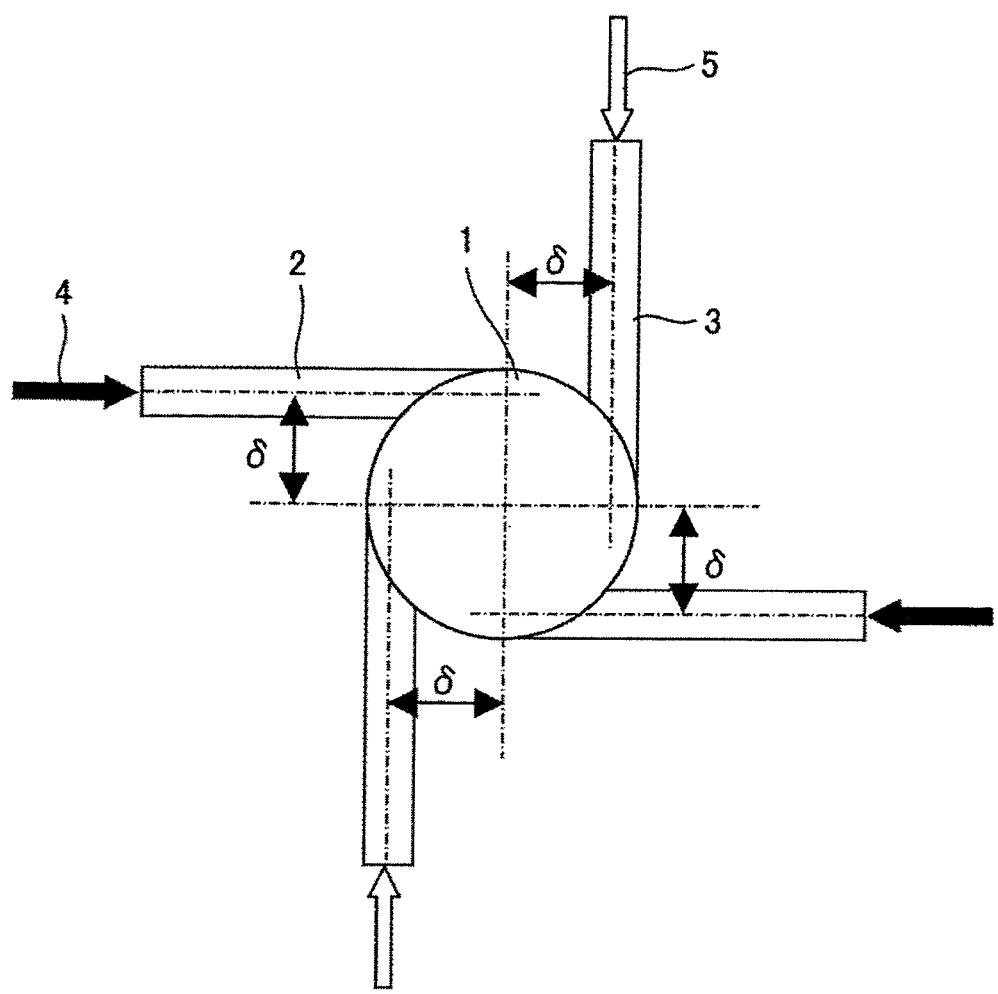
FIG. 14 is a side view in which the reactor illustrated in FIG. 13 is viewed from an upstream side.

As illustrated in FIG. 13, the end of the cylindrically-shaped mixing channel 1 is sealingly closed, and on the side of the sealingly-closed end, provided are the inlet passage 2 for introducing the fluid 4 containing the substance A into the mixing channel 1 and the inlet passage 3 for introducing the fluid 5 containing the substance B into the mixing channel 1. In the present embodiment, on the identical plane perpendicular to the central axis of the mixing channel 1, four of the inlet passages 2, 3, 2, and 3 are provided at 90-degree intervals, and as illustrated in FIG. 14, the respective inlet passages 2 and 3 are placed at a position offset by the distance of δ with respect to the central axis of the mixing channel 1. In an example illustrated in FIG. 13, the respective passages are formed in a rectangular shape, however, may be cylindrically formed. Here, the cylindrical shape may be a polygon shape which approximates a circle, including these, is referred to as the "cylindrical shape" for convenience sake As described above, the inlet passages 2 and 3 are placed on the identical plane perpendicular to the central line of the mixing channel 1, and the central axis of the respective inlet passages 2 and 3 is offset merely by the distance of δ with respect to the central axis of the mixing channel 1. Thus, the fluid 4 flown from the inlet passage 2 and the fluid 5 flown from the inlet passage 3 become the swirling flow 6 in the mixing channel 1.

The inlet passages 2 and 3 are alternately arranged on the identical plane perpendicular to the central line of the mixing channel 1. Thus, the flow shown in a cross section as viewed from the direction of the arrow I-I' of the mixing channel 1 in FIG. 13 forms the swirling flow in which the fluids 4 and 5 are alternately layered in the radial direction similarly to FIG. 3 of Embodiment 1. When such flow occurs, the diffusion length of two types of the fluids decreases, and accordingly, the effect of the swirling flow further improves the miscibility. The flow in the mixing channel is flown under the turbulent flow conditions, thereby further improving the mixing performance due to the mixture of turbulent flows.

Figure 15:
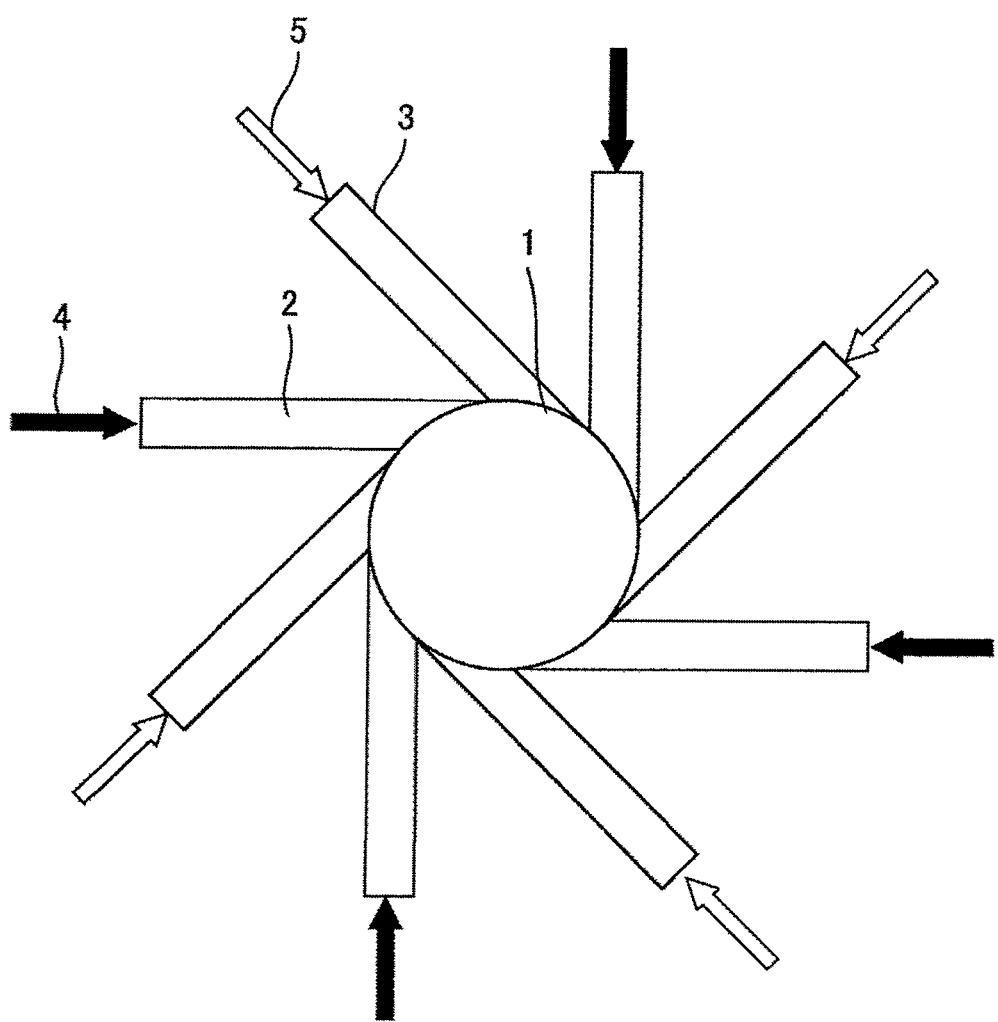
FIG. 15 is a perspective view illustrating a modified example of the reactor according to Embodiment 4 of the present invention.

FIG. 15 is a side view illustrating a modified example of the inlet passages 2 and 3. In this example, on the identical plane perpendicular to the central axis of the mixing channel 1, eight of the inlet passages 2, 3, - - - omitted - - - are provided at 45-degree intervals. As described above, the more the number of the inlet passages increases, the more the number of the layers of the flows increases. Thus, the diffusion length decreases, and the miscibility is improved.

Figure 16:
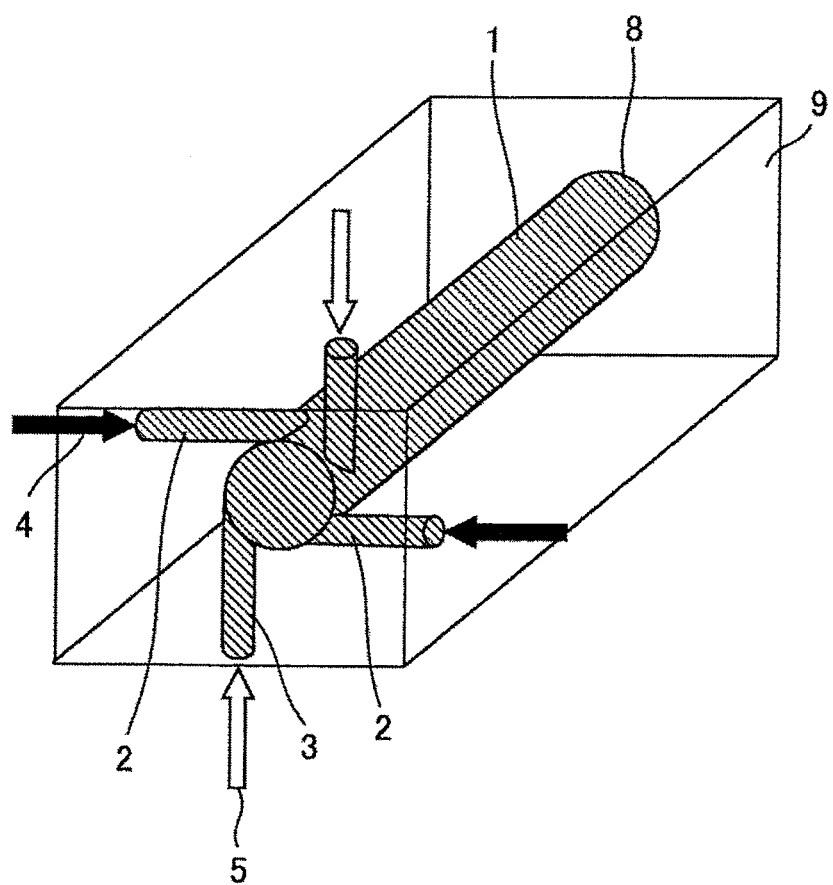
FIG. 16 is a perspective view illustrating a method for manufacturing the reactor illustrated in FIG. 13.

FIG. 16 illustrates one example of the specific method for manufacturing the channel having four of the inlet passages according to the present embodiment. The reactor 9 includes the rectangular-shaped structure. The mixing channel 1 is formed by fabricating the cylindrical hole from the side of the mixing channel outlet 8. The inlet passages 2 and 3 are formed two by two by perpendicularly fabricating a hole to the mixing channel 1 from left, right, top, and bottom sides of the reactor 9. At this time, each of the inlet passages 2 and 3 is formed at the position offset from the central axis of the mixing channel 1.

The materials of the reactor can include metal, glass, plastic, or the like, and are not limited.

In the above-described reactor, two types of the fluids are mixed. However, each of fluids respectively containing a different substance may be flown into the respective inlet passages. Particularly, in the case where the fluids to be mixed are three-typed ones, three of the inlet passages at 120-degree intervals may be provided, or six of the inlet passages at 60-degree intervals may be provided.

Figure 17:
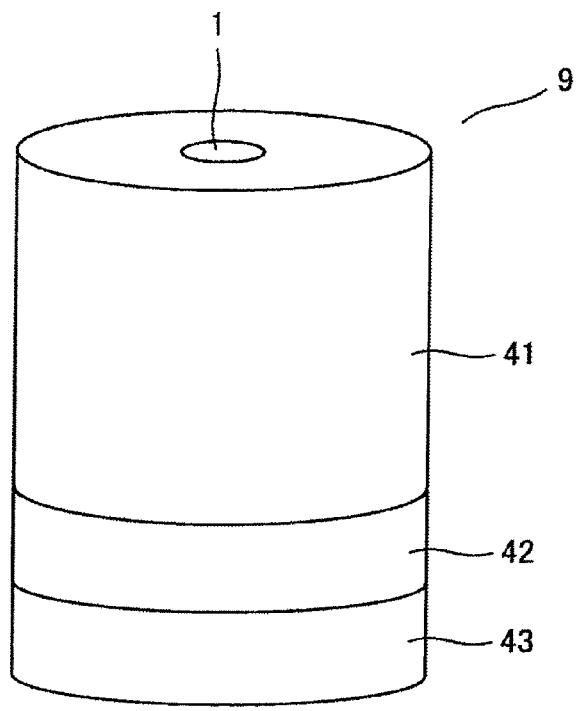
FIG. 17 is a perspective view illustrating a configuration of the reactor illustrated in FIG. 15.

FIGS. 17 to 21 illustrate one example of the specific method for manufacturing the channel of the reactor, which has eight of the inlet passages, according to the present embodiment. FIG. 17 is a perspective view illustrating a configuration of the reactor.

The reactor 9 includes three column-shaped structures of an outlet component 41 in which the mixing channel 1 is formed; a passage component 42 in which the inlet passages are formed; and a buffer component 43 in which buffers, each of which will be a space for temporarily storing therein the fluid as well as buffer inlet passages are formed in order to flow the fluid into the respective inlet passages at the uniform flow rate.

Figure 18:
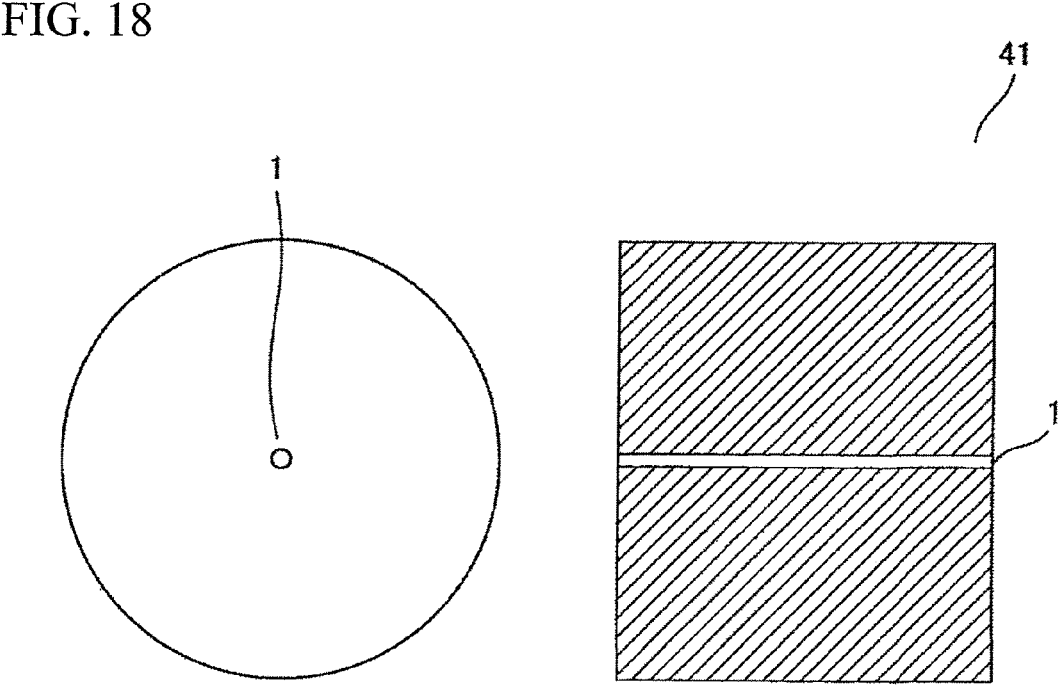
FIG. 18 is a plan view and a cross-sectional view both illustrating a configuration of an outlet component of the reactor illustrated in FIG. 17.

As illustrated in FIG. 18, the outlet component 41 is fabricated such that a cylindrical hole, which will be the mixing channel 1, is penetrated therethrough.

Figure 19:
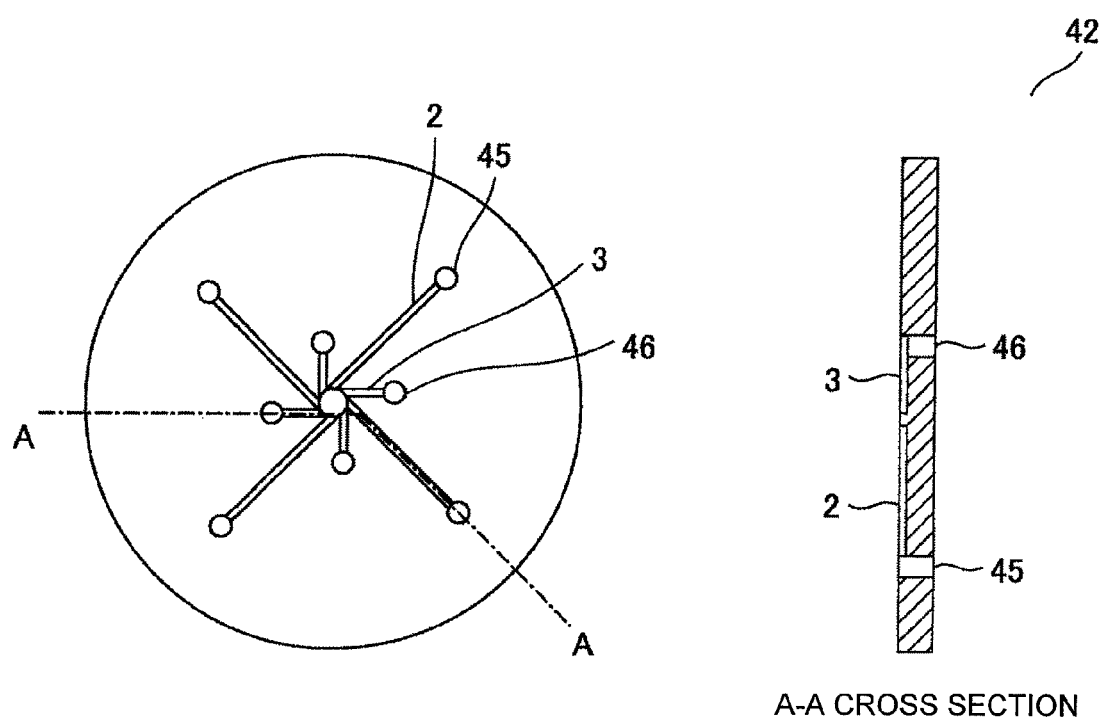
FIG. 19 is a plan view and a cross-sectional view both illustrating a configuration of a passage component of the reactor illustrated in FIG. 17.
Figure 20:
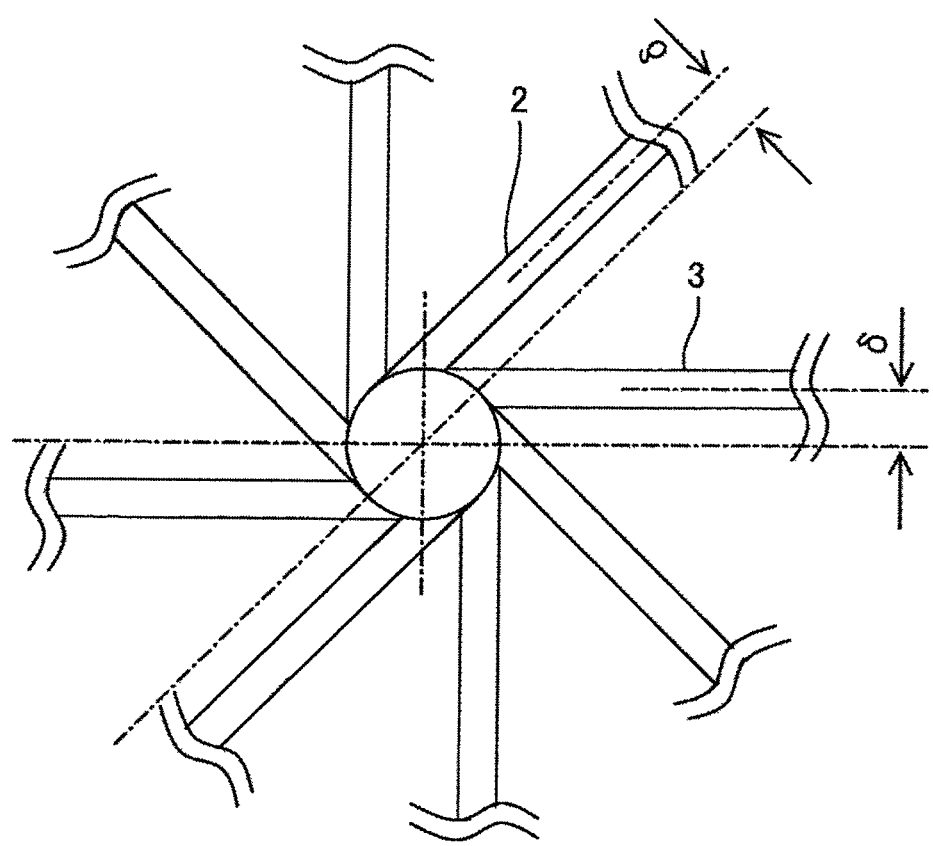
FIG. 20 is a plan view illustrating a detailed configuration of a central part of the passage component illustrated in FIG. 19.

In the passage component 42, as illustrated in FIG. 19, the inlet passages 2 and 3 are fabricated four by four on a plane. As illustrated in FIG. 20, each of the central axes of the inlet passages 2 and 3 is formed at a position offset from the center of the passage component 42 (in other words, the central axis of the mixing channel 1 of the outlet component 41). Regarding the inlet passages 2 and 3, introducing passages 45 and 46 for supplying the fluid from the buffer component 43 into the inlet passages 2 and 3, respectively, are formed on an end face of passages 2 and 3 on an opposite side of the center of the passage component 42.

Figure 21:
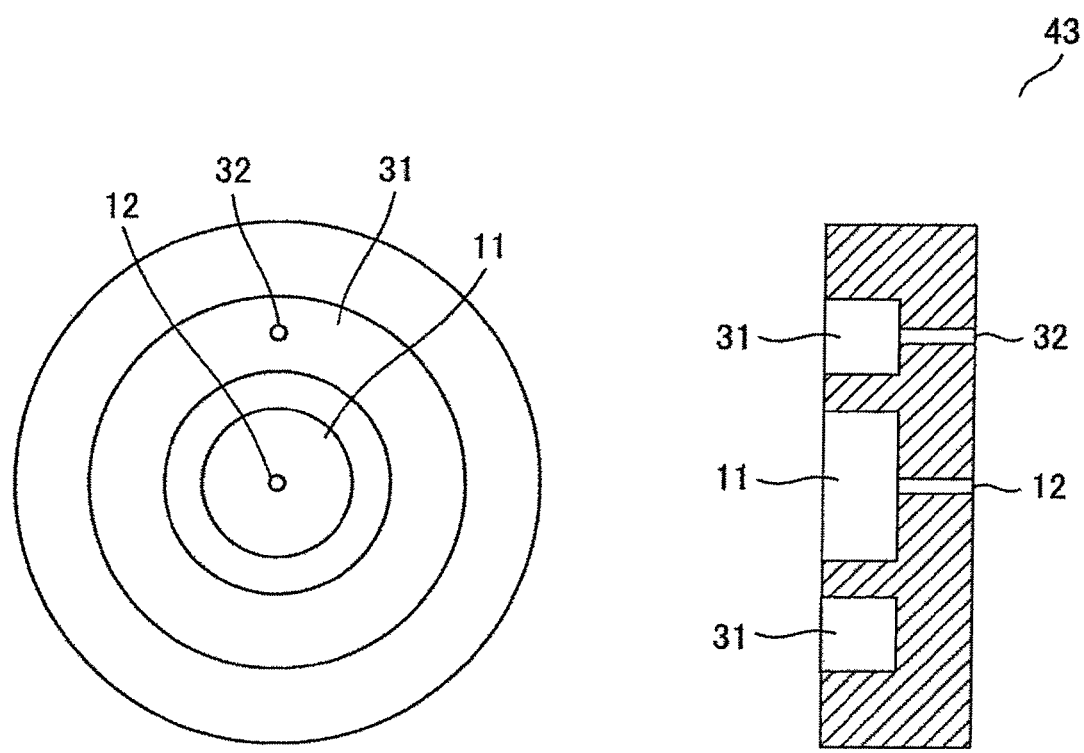
FIG. 21 is a plan view and a cross-sectional view both illustrating a configuration of a buffer component of the reactor illustrated in FIG. 17.

As illustrated in FIG. 21, the buffer component 43 is formed of the buffer 11 and the buffer 31 each of which will be a space for temporarily storing therein the fluid, as well as of the buffer inlet passage 12 and the buffer inlet passage 32 each of which supplies the fluid into the buffer in order to flow the fluid into the respective inlet passages 2 and 3 of the passage component 42 at the uniform flow rate.

For connection of the components 41, 42, and 43, bolt bonding via a sealant material such as an O-ring is used. This makes it possible to disassemble the components 41, 42, and 43 by removing the bolt, and thus, it is possible to easily inspect or wash the passage. Meanwhile, if, for example, the inspection or the washing of the passage is not required, the components 41, 42, and 43 may be mutually joined by means of an adhesive agent, laser welding, diffusion bonding, welding, or the like.

As described above, according to the present embodiment, it is possible to improve the miscibility of the plural fluids, and thus possible to provide the mixing channel which suppresses a side reaction and has a high yield as well as high productivity.

Figure 22:
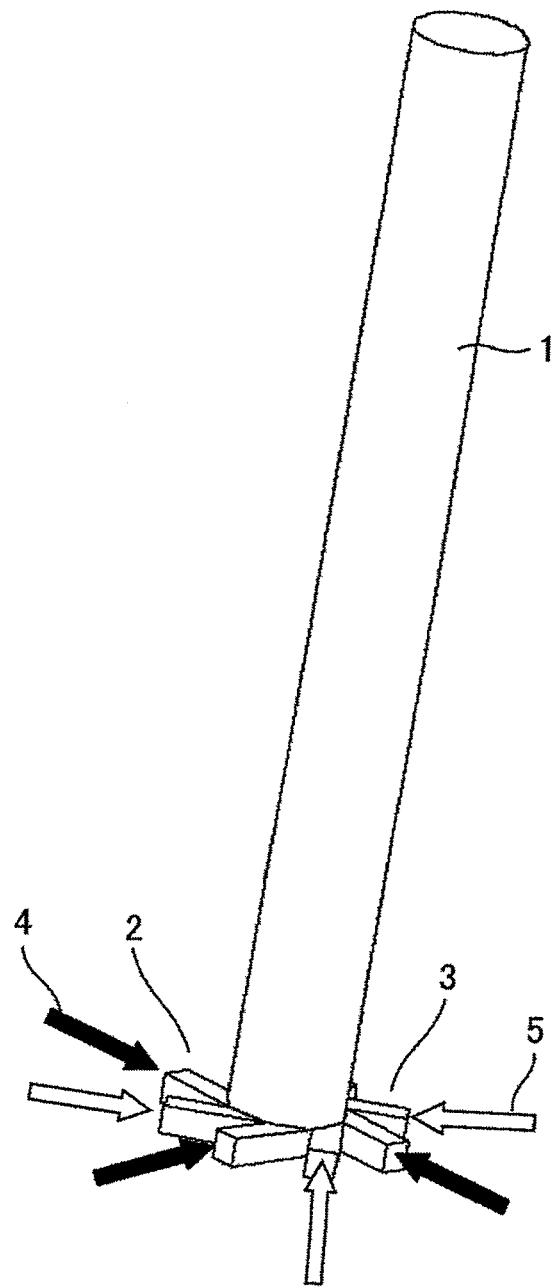
FIG. 22 is a perspective view illustrating an analytical model of the reactor corresponding to Embodiment 4 of the present invention.

According to a result of numerical analysis of the example illustrated in FIG. 20, an effect of the present embodiment mentioned above will be described. FIG. 22 is a perspective view in the case where the inlet passages 2 and 3 are provided four by four.

In this numerical analysis, each of the inlet passages 2 and 3, being provided four by four, had the passage cross-section of 250 μm in height and width, and the passage length of 10 mm The mixing channel 1 had the round-shaped passage cross-section of 1 mm in diameter and the passage length of 80 mm. When the inlet flow velocity in each of the inlet passages 2 and 3 was set to 3.333 m/s, the Reynolds number in the respective inlet passages 2 and 3 was 830, and accordingly, the flow was under the laminar flow conditions, whereas the Reynolds number in the mixing channel 1 was 2,120, and accordingly, the flow was under the turbulent flow conditions. At this time, the flow rate at the mixing channel outlet was 100 mL/min.

Note that the physical properties of the fluids 4 and 5 were identical to those of Embodiment 1.

Figure 23:
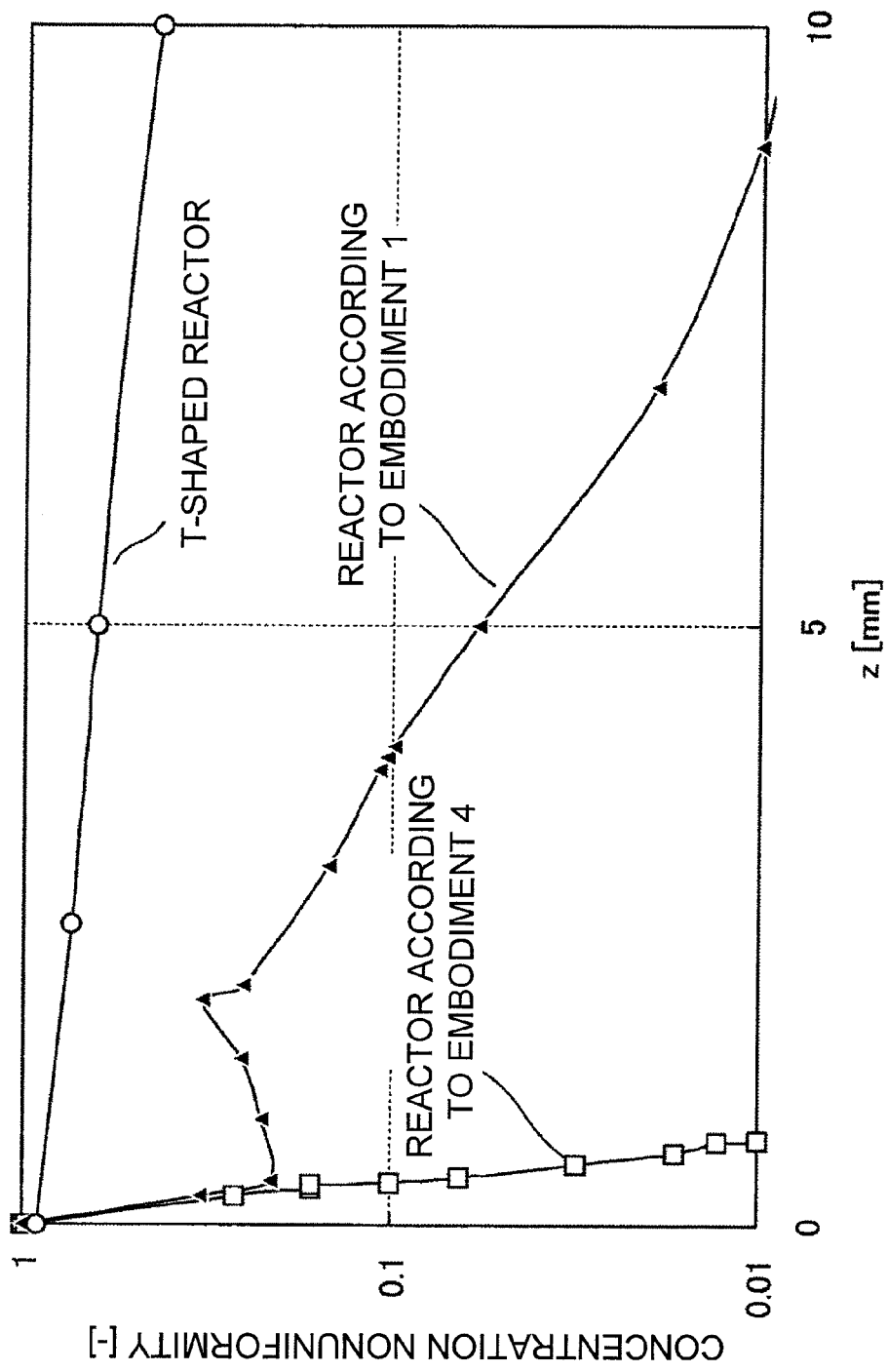
FIG. 23 is a graph showing an analytical result of mixing performance of the reactor.

After the numerical analysis with respect to the reactor according to the present embodiment, the analytical result as shown in FIG. 23 was obtained. FIG. 23 shows a state in which the concentration nonuniformity of the fluid decreases along the flow direction of the mixing channel 1, and also shows the analytical results in the reactor according to Embodiment 1 and the T-shaped reactor. As shown in FIG. 23, it turns out that compared with the reactor according to Embodiment 1 or the T-shaped reactor, the reactor according to the present embodiment has the larger change ratio (slope of the curved line) of the concentration nonuniformity and can shorten the mixing time.

Embodiment 5

Figure 24:
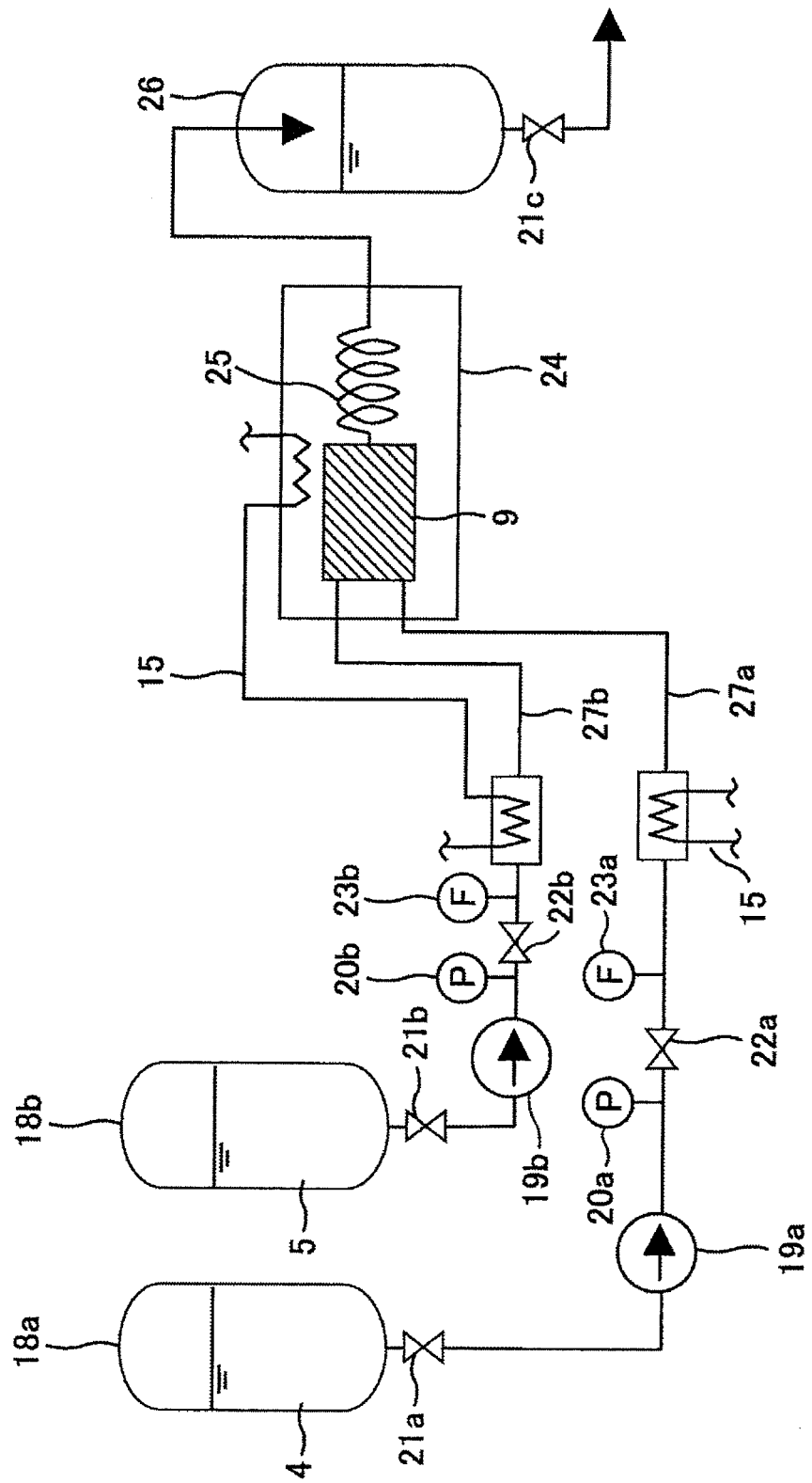
FIG. 24 is a configuration view of a reaction plant which is Embodiment 5 of the present invention.

Embodiment 5 according to the present invention will be explained with reference to FIG. 24. FIG. 24 is a configuration view of a reaction plant using any of the reactors described in Embodiments 1 to 4.

A raw-material storage tank 18a stores therein the fluid 4 containing the substance A. A raw-material storage tank 18b stores therein the fluid 5 containing the substance B. A pump 19a is connected to the raw-material storage tank 18a via an on-off valve 21a. A pump 19b is connected to the raw-material storage tank 18b via an on-off valve 21b.

A pressure gauge 20a, a flow-rate regulating valve 22a, and a flow meter 23a are sequentially connected to the pump 19a. A pressure gauge 20b, a flow-rate regulating valve 22b, and a flow meter 23b are sequentially connected to the pump 19b. The flow path 15 for the heat medium supplies the heat medium into a piping 27a connected to the flow meter 23a, and accordingly, heat exchange is performed. The flow path 15 for the heat medium supplies the heat medium into a piping 27b connected to the flow meter 23b, and accordingly, the heat exchange is performed.

The pipings 27a and 27b are connected to the reactor 9 placed in a constant-temperature bath 24. The reactor 9 is connected to a reaction flow path 25 placed in the constant-temperature bath 24. The reaction flow path 25 is connected to a product storage tank 26. An on-off valve 21c is provided at the bottom of the product storage tank 26, and accordingly, the product is taken out from the product storage tank 26.

The fluid 4 containing the substance A, stored in the raw-material storage tank 18a, is sent to the reactor 9 by the pump 19a and its flow is regulated by the valve 22a based on feedback of the flow-rate measured by the flow meter 23a. The fluid 5, stored in the raw-material storage tank 18b, containing the substance B is sent to the reactor 9 by the pump 19b and its flow is regulated by the valve 22b based on feedback of the flow-rate measured by the flow meter 23b.

The reactor 9 and the reaction flow path 25 are placed in the constant-temperature bath 24, and are controlled so as to have preset temperature by means of the heat medium supplied by the flow path 15 for the heat medium. Regarding the fluids 4 and 5 sent to the reactor 9, as described in Embodiments 1 to 4, the fluid 4 containing the substance A and the fluid 5 containing the substance B flow from the inlet passages 2 and 3, respectively, into the cylindrically-shaped mixing channel 1, and the fluid 4 flown from the inlet passages 2 and the fluid 5 flown from the inlet passage 3 form the swirling flow in which the fluids 4 and 5 are alternately layered in the radial direction. When such flow occurs, the diffusion length of two types of the fluids decreases, and accordingly, the effect of the swirling flow improves the miscibility. Two types of raw materials are mixed and reacted in the reactor 9 and the reaction flow path 25, and thereafter, are stored in the product storage tank 26.

According to the present embodiment, the reaction plant using the reactor makes it possible to manufacture a reactant having a high yield and high production volume. It is well known that a flow in the pipe is changed into a turbulent flow from a laminar flow at the Reynolds number based on the mean velocity in the pipe, the inner diameter of the pipe and the kinematic viscosity of the fluid between 2000 and 4000 (Heat Transfer Fifth edition, J.P. Holman McGRAW-HILL INTERNATIONAL BOOK COMPANY, p.172).

As described above, in the respective embodiments, the plurality of fluids, each containing the different kind of substance, are merged into the cylindrically-shaped mixing channel having the inner diameter preferably less than 10 mm, and the inlet passages which introduce the plurality of fluids, each containing the different kind of substance, into the mixing channel are placed such that the central axis of the inlet passage dose not intersect with that of the mixing channel. Additionally, the inlet passage has the angle less than 90 degrees with respect to the flow direction of the mixing channel. Moreover, the inlet passages are placed in the flow direction of the mixing channel in a multi-stage manner. This makes it possible to provide the mixing channel capable of decreasing the diffusion length by flowing the plurality of fluids in the radial direction in the mixing channel in a multi-layered manner; suppressing a side reaction and obtaining a high reaction yield by synergizing the effects of the turbulent flow as well as the swirling flow and facilitating the miscibility of the plurality of fluids; and further, actualizing mass-volume processing by decreasing the pressure loss.

Industrial Applicability

It is possible to improve a reaction yield in a reaction of a plurality of substances contained in fluids in a synthetic process of a drug medicine and a chemical industrial product, and to increase production volume.

The invention claimed is:

1. A reactor comprising;
a cylindrically-shaped mixing channel and plurality of inlet passages provided on the mixing channel each of the plurality of inlet passages being placed along a tangential direction of a peripheral wall of the cylindrically-shaped mixing channel and at an angle with respect to each other when being viewed from a direction of a central axis of the mixing channel to achieve a swirling flow therein so as to facilitate miscibility of a plurality of fluids introduced by the plurality of inlet passages,
wherein the plurality of inlet passages are configured to introduce a plurality of fluids containing different kinds of substances into the mixing channel in a predetermined periodic sequence with respect to the kind of substance along the tangential direction of the peripheral wall of the cylindrically-shaped mixing channel to achieve a multi-layered flow therein so as to facilitate the miscibility of the plurality of fluids, and
wherein the plurality of inlet passages are configured to provide a turbulent flow condition in the mixing channel so as to facilitate the miscibility of the plurality of fluids.

2. The reactor according to claim 1, wherein the condition of turbulent flow is defined with the Reynolds number based on the mean velocity in the mixing channel, the inner diameter of the mixing channel and the kinematic viscosity of the fluid in the mixing channel, where the mean velocity is the average value of the velocity in the flow direction in the cross section of the cylindrically-shaped mixing channel.

3. The reactor according to claim 2, wherein the Reynolds number is over 2000.

4. The reactor according to claim 1, wherein a direction of a central axis of each of the plurality of the inlet passages is arranged at an angle of 90 degrees or less with respect to a central axis of the mixing channel.

5. The reactor according to claim 1, wherein a first plurality of inlet passages are provided and configured to introduce a first of the plurality of fluids containing a first substance and a second plurality of inlet passages are provided and configured to introduce a second of the plurality of fluids containing a second substance, each of the first plurality of inlet passages being placed with a space therebetween in the flow direction of the mixing channel, and each of the second plurality of net passages being placed with a space therebetween in the flow direction of the mixing channel.

6. The reactor according to claim 1, wherein a structure is mounted at a center of the mixing channel.

7. The reactor according to claim 6, wherein the structure mounted at the center of the mixing channel is shaped such that a cross-sectional area decreases toward a downstream side of the mixing channel.

8. The reactor according to claim 1, wherein the reactor comprises a structure having the mixing channel and the structure is equipped with a plurality of flow paths distributing a heat medium into the structure.

9. The reactor according to claim 1, wherein the reactor comprises a structure having the mixing channel and the structure is equipped with a plurality of fins for heat exchange on a surface thereof.

10. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;

the reactor according to claim 1;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

11. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;
the reactor according to claim 4;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

12. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;
the reactor according to claim 5;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

13. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;
the reactor according to claim 6;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

14. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;
the reactor according to claim 7;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

15. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;
the reactor according to claim 8;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

16. A reaction plant comprising:
a plurality of tanks storing therein a plurality of fluids each containing a different kind of substance;
pumps placed respectively on each piping connected to each of the plurality of tanks, the pumps sending the fluids to the mixing channel;
a flow-rate regulator configured to adjust a flow rate of the fluid to the mixing channel;
the reactor according to claim 9;
a reaction flow path connected to an outlet side of the mixing channel, the reaction flow path reacting mixed fluid;
a tank storing therein a product from the reaction flow path; and
a temperature controller controlling temperature in the mixing channel and the reaction flow path.

\* \* \* \* \*